US006874496B2

(12) United States Patent
Waits et al.

(10) Patent No.: US 6,874,496 B2
(45) Date of Patent: Apr. 5, 2005

(54) COMBINATION SMOKER AND BARBECUE PIT

(76) Inventors: Gregory A. Waits, 6803 Spring Lark St., San Antonio, TX (US) 78249; Christopher M. Waits, 14219 Scenic Path Ct., Cypress, TX (US) 77429

( * ) Notice: Subject to any disclaimer, the term of this patent is extended or adjusted under 35 U.S.C. 154(b) by 32 days.

(21) Appl. No.: 10/465,275

(22) Filed: Jun. 19, 2003

(65) Prior Publication Data

US 2004/0255926 A1    Dec. 23, 2004

(51) Int. Cl.[7] .............................................. A47J 37/00
(52) U.S. Cl. ..................... 126/25 R; 126/1 D; 126/9 R; 99/447
(58) Field of Search .......................... 126/25 R, 41 R, 126/50, 9 R, 25 A, 39 R, 19 R, 1 D; 99/481, 99/482, 467, 473, 340, 448, 339, 447

(56) References Cited

U.S. PATENT DOCUMENTS

| | | | |
|---|---|---|---|
| 2,666,425 A | 1/1954 | Hastings, Jr. | |
| 3,379,190 A | 4/1968 | Leach | |
| 4,094,295 A | 6/1978 | Boswell et al. | |
| 4,467,709 A | 8/1984 | Anstedt | |
| 4,495,860 A | 1/1985 | Hitch et al. | |
| 4,700,618 A * | 10/1987 | Cox, Jr. | 99/339 |
| 4,962,697 A | 10/1990 | Farrar | |
| 5,251,607 A * | 10/1993 | Traeger et al. | 126/25 R |
| 5,359,923 A | 11/1994 | Boswell | |
| 5,460,159 A * | 10/1995 | Bussey | 126/25 R |
| 5,473,979 A | 12/1995 | Ruben | |
| 5,768,977 A * | 6/1998 | Parris et al. | 99/340 |
| 6,223,737 B1 * | 5/2001 | Buckner | 126/25 R |
| 6,595,197 B1 * | 7/2003 | Ganard | 126/25 R |

* cited by examiner

Primary Examiner—James C. Young
(74) Attorney, Agent, or Firm—Gunn & Lee, P.C.

(57) ABSTRACT

A new and improved combination smoker and barbecue pit having a housing with an open top, a grill resting on said housing, and a hood. A firebox is placed within said housing and is used for holding fuel which, when burned, creates heat and smoke. During the smoking process, the firebox is positioned below a shield which deflects and directs smoke into a pair of chambers within the housing which in turn channel smoke into elongated collection members evenly spaced below the grill. When smoke fills the collection members, is spills out the open-ended bottom of the collection members and drifts toward the grill in an even distribution. The firebox can also rest on the collection members where it is directly beneath the grill for barbecuing.

18 Claims, 5 Drawing Sheets

COMBINATION SMOKER AND BARBECUE PIT

BACKGROUND OF THE INVENTION

1. Field of the Invention

The present invention relates generally to the field of barbecue grills, cookers, and smokers and, more specifically, to a new design for a smoker which allows for more evenly distributed heating and smoking of food and which can also be adjusted to act as a barbecue grill or cooker.

2. Description of Related Prior Art

The prior art is crowded with barbecue grills and smokers, in combination and separately. Typically, these devices use charcoal briquettes or wood as a heat source to cook food placed on a grill near the heat source. The devices are often adjustable in some manner to allow for smoking the food as opposed to grilling it over an open flame.

Traditional smokers are constructed with the fireboxes located to the right or left of the grill and the smoker housing. In this type of construction, smoke and heat from the firebox is allowed to drift into the smoker housing through vents and thereby cooking and smoking the meat. The problem with this traditional type of smoker is that food items placed closer to the firebox smoke and cook faster than food items placed further away. This requires food items to be continually monitored and rotated on the grill to ensure even cooking/smoking of the food items.

There are many other smoker and barbecue grill designs where the cooking surface is positioned above the heat source. An example of these designs include the following: U.S. Pat. No. 4,094,295 to Boswell, et al; U.S. Pat. No. 4,467,709 to Anstedt; U.S. Pat. No. 4,495,860 to Hitch, et al; U.S. Pat. No. 4,962,697 to Farrar; and U.S. Pat. No. 5,359,923 to Boswell. Typically, the fireboxes and/or the grills in the aforementioned patents are adjustable to various heights depending on whether smoking or barbecue style heating is desired. Many of these inventions also contain water pans to create steam to mix with the smoke during the cooking process.

A patent to Hastings, U.S. Pat. No. 2,666,425, describes a hooded barbecue grill with two sets of rails placed at different heights below in the grill to support a removable firebox. The upper rails are also used to support a heat deflector when the firebox is located and supported by the lower set of rails. A patent to Leech, U.S. Pat. No. 3,379,190, also discloses a barbecue pit which allows for a varying heights of the firebox. The Leech design has two fireboxes each of which is supported in a cantilever fashion from opposite sidewalls of the device. The fireboxes can be raised and lowered to vary the cooking heat at the grill level. While the Hastings and Leech design allow for adjustable firebox heights to vary temperatures at the grill, it does not allow for even distribution of smoke when smoking the food items placed on the grill.

A patent to Bussey, U.S. Pat. No. 5,460,159, discloses a smoker/barbecue pit which allows smoking and barbecuing at the same time. This invention directs heat and smoke around and towards the grilling surface from the sides of the grilling surface. This patent also describes directing smoke and heat through opening on the sides of the units where detachable pot warmers can be attached.

Finally, a patent issued to Ruben, U.S. Pat. No. 5,473,979, discloses a three-chambered "smoker". The lower chamber where the firebox is located, has a rotatable partition plate which controls and directs heat and smoke from below and catches and funnels off drippings from above.

Some or all of the aforementioned patents and prior art attempt to direct and channel heat and smoke in order to vary the temperature and more evenly distribute the heat and smoke. This is done with shielding devices which rest between the heat source and the grilling surface and/or the shape of the hood above the grilling surface. However, none of the aforementioned patents allow heat and smoke to collect and drift upwards toward the grilling surface in an even distribution. It can be seen that there remains a need for a smoker/barbecue grill which more effectively allows for an even distribution of smoke and heat from the fire pit.

SUMMARY OF THE INVENTION

It is an object of the present invention to provide a combination smoker and barbecue grill which evenly distributes smoke across food items being cooked on the grill.

It is another objection of the present invention to provide a combination smoker and barbecue grill which encloses a fuel burning firebox underneath the grill.

It is another object of the present invention to provide a combination smoker and barbecue grill which has a smoke shield positioned between the grill and firebox which deflects and directs smoke into smoke collection members.

It is another object of this invention to provide a combination smoker and barbecue grill which directs smoke from the firebox into smoke collection members which in turn fill and allow smoke to drift in an even distribution towards food items cooked on the grill.

It is another object of the present invention to provide a combination smoker and barbecue grill which has doors and vent hatches for the easy removal of a drip pan and the firebox.

It is another object of the present invention to provide for vent hatches which function as air supply vents for the combustion process.

It is another object of the present invention to make maximum use of the features of the combination smoker and barbecue grill by providing smoke collection members which also act as a support for placement of the firebox at an upper level closer to the grill for barbecuing.

It is another object of the present invention to make maximum use of the features of the combination smoker and barbecue grill by providing the smoke shield which also acts as a support for the placement of the drip pan during the smoking process.

In satisfaction of these and related objectives, Applicant's present invention provides for a combination smoker and barbecue grill which has a grill that rests on a housing and which is covered by a hood. The housing encloses a removable firebox for holding wood, charcoal, or other fuel while burning, a smoke shield positioned between the grill and firebox and smoke collection members are positioned between the grill and smoke shield.

The smoke shield is centered above the firebox and deflects and directs smoke from the firebox around the front and back edges of the smoke shield into a pair of smoke chambers positioned within the housing and below the grill. Smoke is allowed to fill the smoke chambers from top to bottom. As the smoke reaches the bottom of the smoke chambers, it spills into a plurality of elongated, evenly spaced, smoke collection members attached to interior panels forming the interior barriers for the smoke chambers.

Once the smoke fills the smoke collection members from top to bottom, it will spill out the open-ended bottoms of the smoke collection members. This causes a substantially even distribution of smoke to rise from the smoke collection members toward food items on the grill, allowing the food items to smoke and cook evenly.

A drip pan, which is placed on the top surface of the smoke shield, catches and collects drippings from the food items. These drippings will evaporate in the drip pan creating vapors which will rise back towards the food items on the grill further flavoring the food items. Water can be placed in the drip pan during the smoking process which will create steam which rises with the smoke and helps prevent the food items from drying out during the smoking process.

Side doors on both housing sidewalls can be rotated open to allow access to and removal of the drip pan and firebox for refueling and cleaning. A smaller vent hatch below the side doors also allow for access to and removal of the firebox and act as air supply vents for the combustion process.

If desired, the invention can be converted to a traditional barbecue grill by placing the firebox on top of the smoke collection members. In this manner, the firebox is positioned above the smoke shield, closer to the grill and directly heats and cooks the food items on the grill in traditional barbecue style.

The above and other objects and advantages of the present invention will become more readily apparent when references made to the following description taking in conjunction with the accompanied drawings.

DETAILED DESCRIPTION OF THE PREFERRED EMBODIMENT

Figure 1:
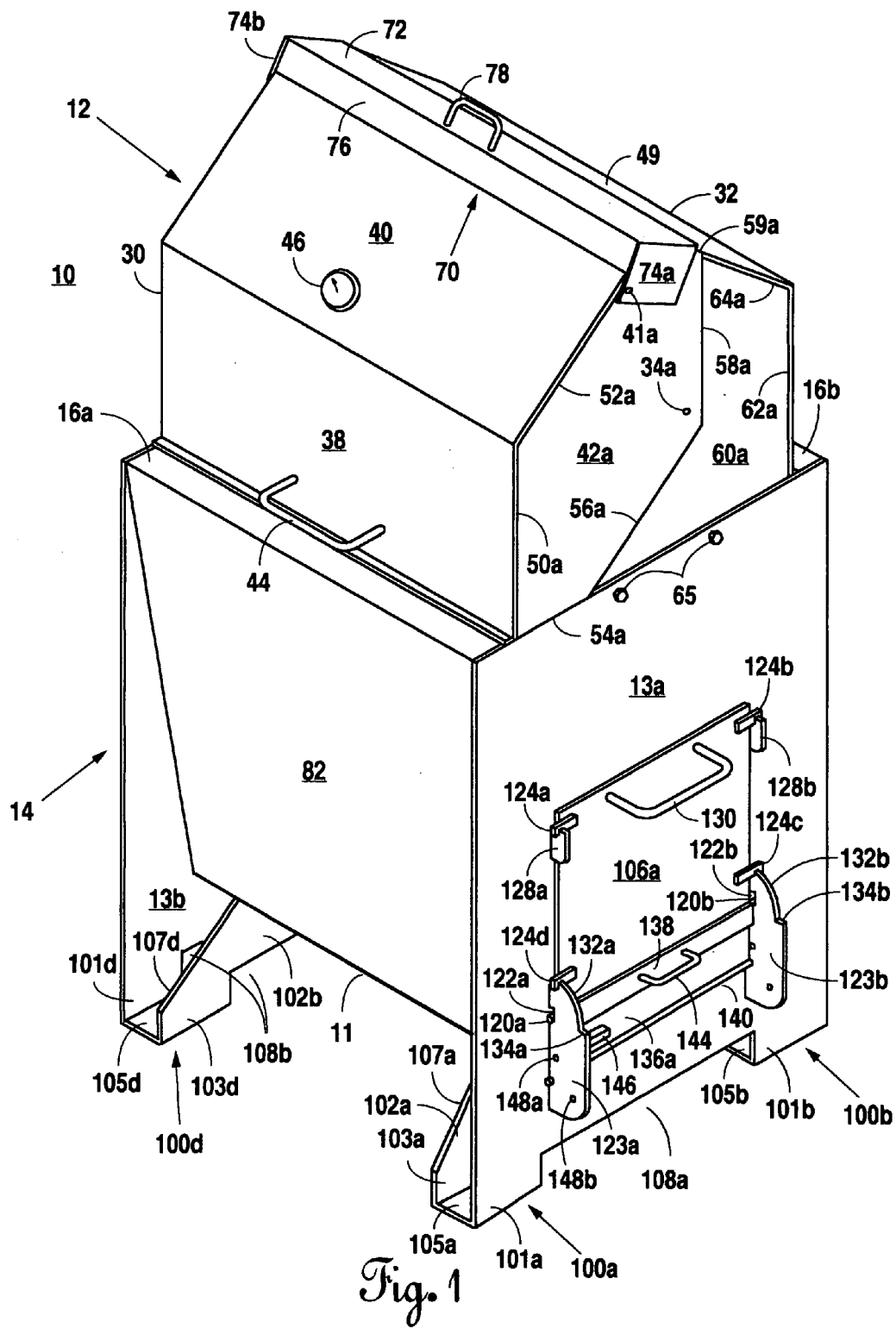
FIG. 1 is a perspective view of the preferred embodiment of the present invention.

Referring to FIGS. 1–6, a combination smoker and barbecue grill 10 is equipped with a hood 12 and a housing 14. The hood 12 covers a grill 15 which rests on the outer surface of opposed upper shoulder panels 16a and 16b of the housing 14. The housing 14 has a casing 11 and housing sidewalls 13a and 13b and forms and enclosure for a firebox 18, a smoke shield 20, a drip pan 22, and a plurality smoke collection members 23a, 23b, 23c, and 23d.

Figure 2:
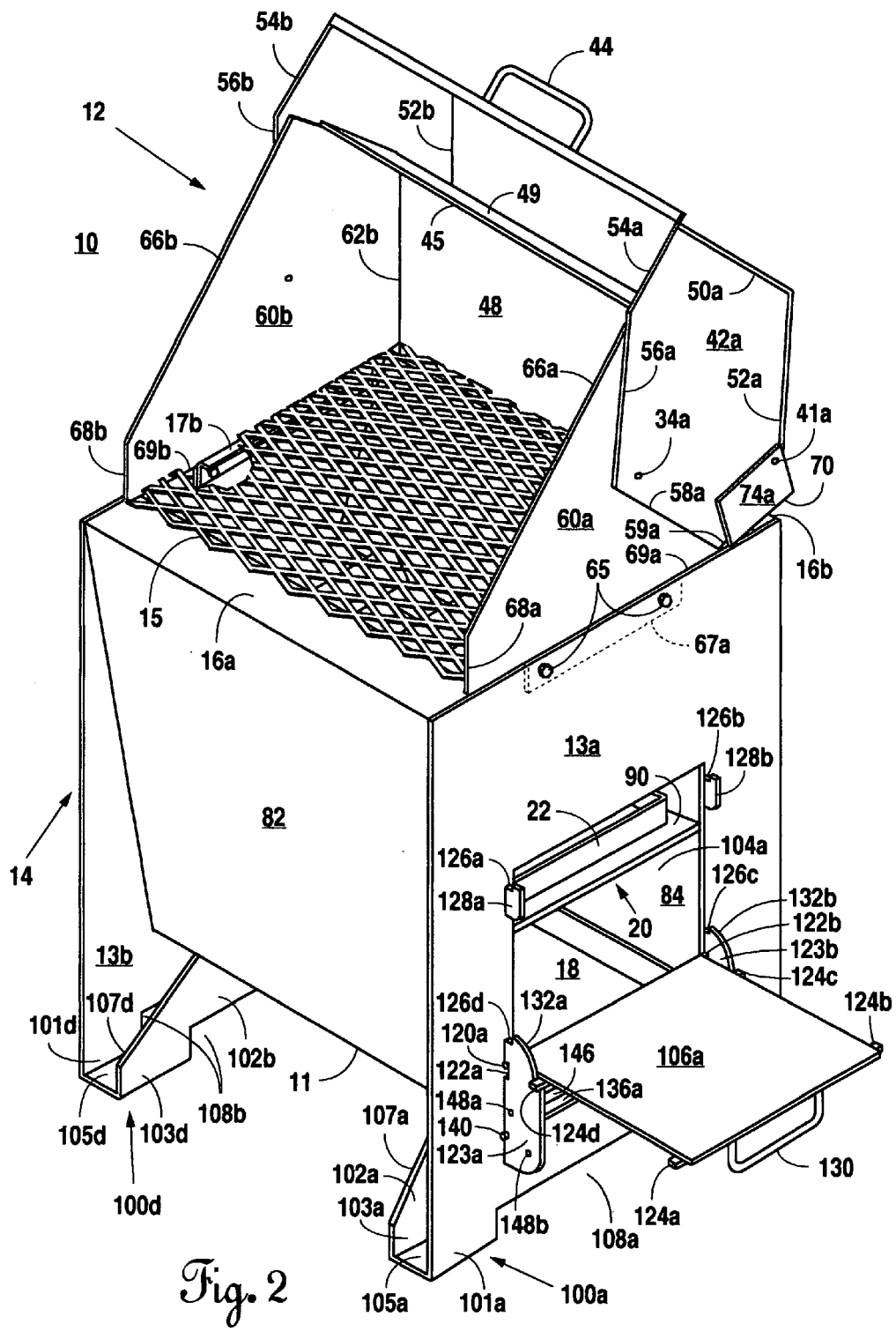
FIG. 2 is the same perspective view of the preferred embodiment of the present invention showing the hood and one side door in their open positions and partly cut away to show the relative positions of the internal structure.
Figure 3:
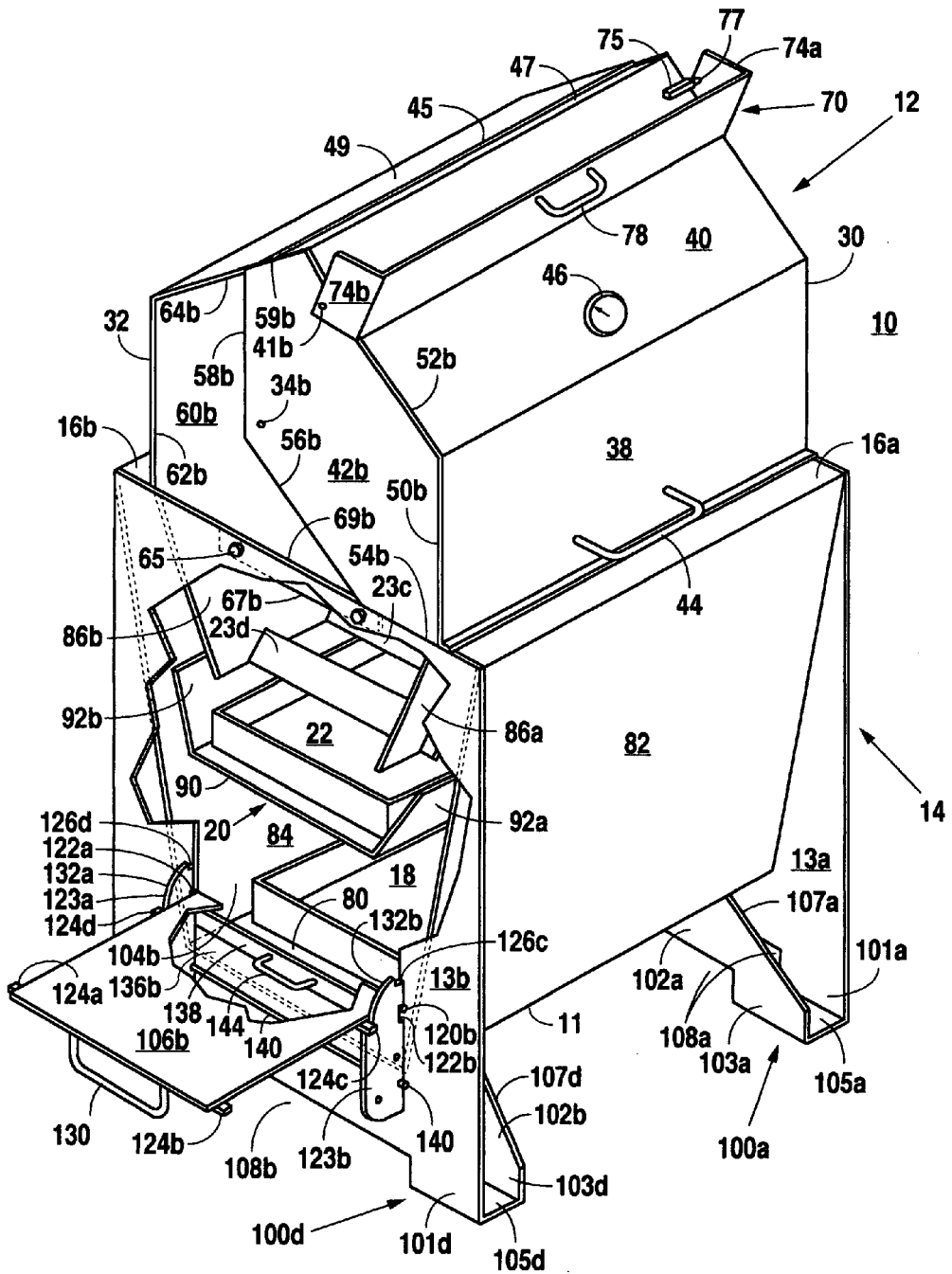
FIG. 3 is another perspective view of the present invention which is partly cut away to show the relative positions of the internal structure.

Referring FIGS. 1–3, the hood 12 has a rotatable portion 30 pivotally connected to a stationary portion 32 by pins 34a and 34b. The rotatable portion 30 of the hood 12 has a vertical front panel 38, an angled front panel 40 and two rotatable sidewalls 42a and 42b. The vertical front panel 38 and angled front panel 40 are constructed from one continuous sheet of material bent at its approximate centerline to form the vertical front panel 38 and the angled front panel 40 which angles upwardly and inwardly towards the crest of the hood 12. The vertical front panel 38 is equipped with a handle 44 adjacent its lower end. A temperature indicator 46 is mounted to the upper angled front panel 40. In the preferred embodiment of this invention, the temperature indicator is manufactured by Taylor, Model No. 1470 and the vertical front panel 38 and angled front panel 40 are constructed of 16 gauge sheet metal.

Still referring FIGS. 1–3, the rotator sidewalls 42a and 42b are hexagonal and have front vertical edges 50a and 50b and front angled edges 52a and 52b which are shaped to conform to the outer edges of the vertical panel 38 and upper angled panel 40. A pair of horizontal bottom edges 54a and 54b of the rotatable sidewalls 42a and 42b rest against respective upper edges of the housing sidewalls 13a and 13b when the hood 12 is in its closed position. In order to allow the rotatable section 30 of the hood 12 to pivot at the pins 34a and 34b, lower back edges 56a and 56b of the rotating sidewalls 42a and 42b extend from the back ends of the bottom edges 54a and 54b and angle upwardly and backwardly in a direction generally towards, below and slightly beyond the pins 34a and 34b. Upper back edges 58a and 58b of the rotating sidewalls 42a and 42b extend vertically from the upper ends of the lower back edges 56a and 56b to points adjacent an angled back panel 49 of the stationary portion 32 of the hood 12 when the rotating portion 30 of the hood 12 is in its closed position (See FIG. 1). A pair of top edges 59a and 59b of the rotatable sidewalls 42a and 42b extend respectively from the upper ends of the upper back edges 58a and 58b of the rotating sidewalls 42a and 42b to the crest of the hood 12. In the preferred embodiment, the rotating sidewalls 42a and 42b are constructed of 16 gauge sheet metal.

Figure 4:
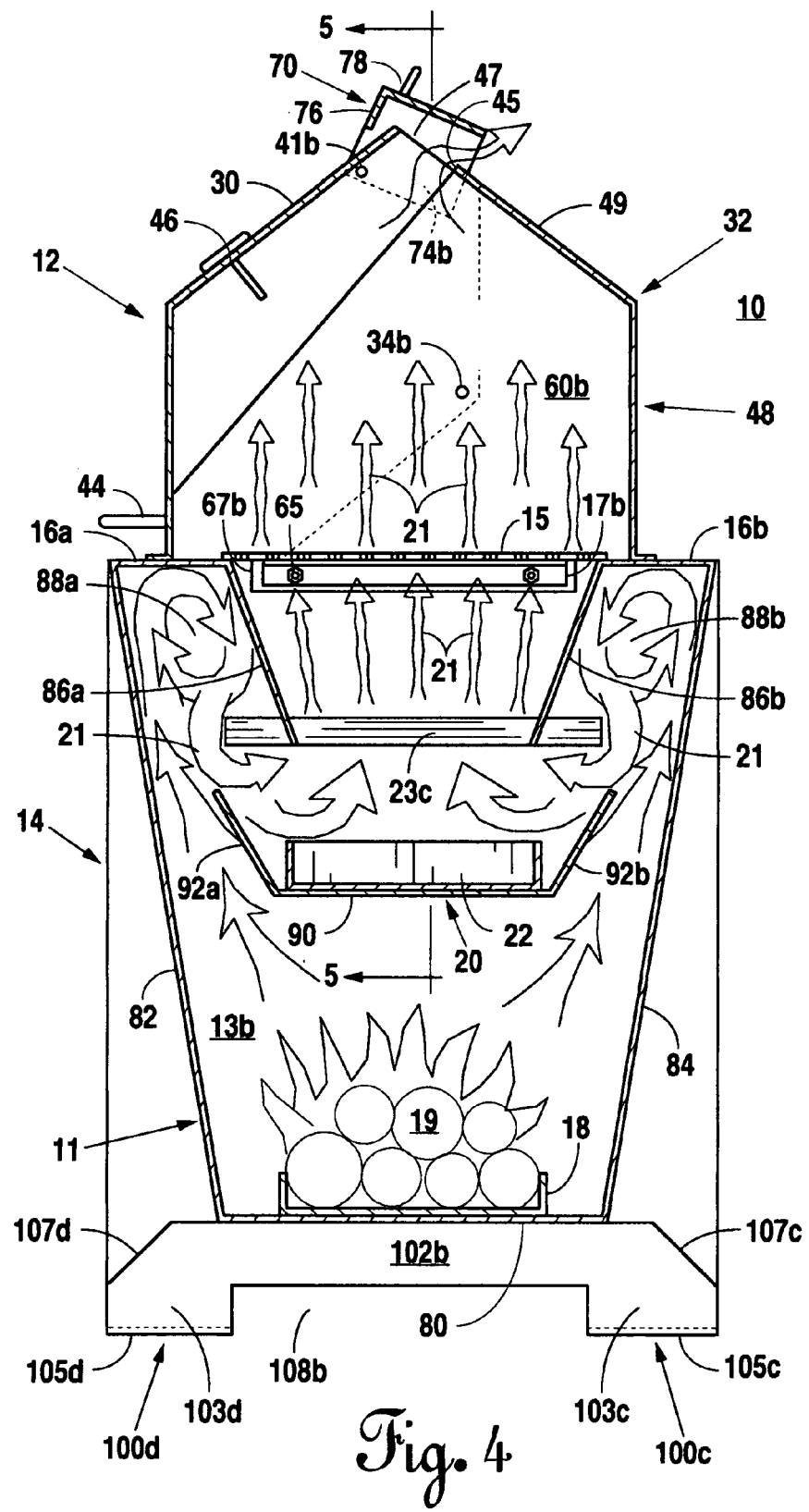
FIG. 4 is a partial cross sectional side elevational view of the preferred embodiment of the present invention.

Still referring to FIGS. 1–3, the stationary portion 32 of the hood has a vertical back panel 48, an angled back panel 49 and two stationary sidewalls 60a and 60b. The vertical back panel 48 and angled back panel 49 are preferably constructed from one continuous rectangular sheet of material bent at its approximate centerline to form the vertical back panel 48 and angled back panel 49 which angles forwardly and inwardly toward the crest of the hood 12. As shown in FIGS. 3 and 4, the angled back panel 49 does not extend to the crest of the hood 12 creating a rectangular vent opening 47 across the width of the stationary portion 32 of the hood 12 between the upper edge 45 of the upper angled back panel 49 and the crest of the hood 12. In an exemplary embodiment, the size of the vent opening is 3 inches×24 inches. However, it is anticipated that the size of the opening could vary as long as it is sufficient to adequately vent smoke when desired.

Referring to FIGS. 1–4, a vent cover 70 is pivotally connected to the rotatable sidewalls 42a and 42b. The vent cover 70 has a top portion 72 which is of sufficient width and depth to allow the vent cover 70 to cover the vent opening 47 with minimal clearance with the vent cover 70 is in its closed position (See FIG. 1). Rectangular side flaps 74a and 74b extent perpendicularly from opposite side edges of the top portion 72 of the vent cover 70. The side flaps are adjacent, parallel with, and pivotally connected to the respective rotatable sidewalls 42a and 42b with pins 41a and 41b. A front flap 76 extends perpendicularly from the front edge of the top portion 72 of the vent cover 70 along the entire width of the vent cover 70. The height of the front flap 76 is sufficient to allow the lower edge of the front flap 76 to rest against the angled front panel 40 when the vent cover 70 is in its closed position (See FIG. 1). A handle 78 is centered on and extends from the top portion 72 of the vent cover 70 to allow an operator to rotate the vent cover 70 from a closed position to an open position (See FIG. 3).

A spring loaded pressure pin 75 is mounted to the outer surface of the angled front panel 40 adjacent the crest of the hood 12 and positioned such that a pinhead 77 of the pressure pin 75 presses against the inner surface of at least one side flap 74a and 74b of the vent cover 70 at all times. The frictional force created between the pinhead 77 and the side flap 74b is sufficient to allow the vent cover 70 to remain in place in any rotated position. In the exemplary embodiment, the vent cover 70 is constructed of 16 gauge sheet metal. However, it is anticipated that other gauges and material may be used.

Referring again to FIGS. 1–3, the stationary sidewalls 60a and 60b of the hood 12 have vertical back edges 62a and 62b and angled back edges 64a and 64b which conform to the shape of the vertical back panel 48 and angled back panel 49 at their side edges. The angled back edges 64a and 64b extend respectively from the upper ends of the vertical back edges 62a and 62b to a point adjacent the opposing side ends of the upper edge 45 of the angled back panel 49. The stationary sidewalls 60a and 60b of the hood 12 each have angled front edge 66a and 66b with upper ends terminating at the crest of the hood 12 and lower ends adjacent the vertical edges of the vertical front panel 38. The hood is rotated to a closed position (See FIG. 1). The stationary sidewalls 60a and 60b have vertical front edges 68a and 68b (See FIG. 2) which extend from the lower ends of the angled front edges 66a and 66b and rest against the upper shoulder 16a of the casing 11. Bottom edges 69a and 69b of the stationary sidewalls 60a and 60b extend from respective lower ends of the front edges 68a and 68b to the lower ends of the vertical edges 62a and 62b of the stationary sidewalls 60a and 60b. In the exemplary embodiment, the height of the front edges 68a and 68b is approximately 4 inches. However, it is anticipated that a range of heights are suitable as long as the rotating portion 30 of the hood 12 can open and close freely.

Referring to FIGS. 1, 2, 3, and 5, the width of the stationary portion 32 of the hood 12 is equal to the width between the interior surfaces of the housing sidewalls 13a and 13b. As shown in FIGS. 2 and 4, rectangular mounting flanges 67a and 67b extend from respective bottom edges 69a and 69b of each of the stationary sidewalls 60a and 60b and are positioned flush against the interior surfaces of the housing sidewalls 13a and 13b. The mounting flanges 67a and 67b are connected to the housing sidewalls 13a and 13b with nut and bolt combinations 65. The stationary portion 32 of the hood 12 is mounted and fixed to the housing 14 in this manner. In the exemplary embodiment, each combination of the mounting flanges 67a and 67b and stationary sidewalls 60a and 60b are constructed of a continuous sheet of 16 gauge sheet metal.

The shape of the hood 12 has been described in detail in this preferred embodiment. It is anticipated that various modifications to the shape and design of the hood 12 are acceptable and would become apparent to persons skilled in the art.

Figure 5:
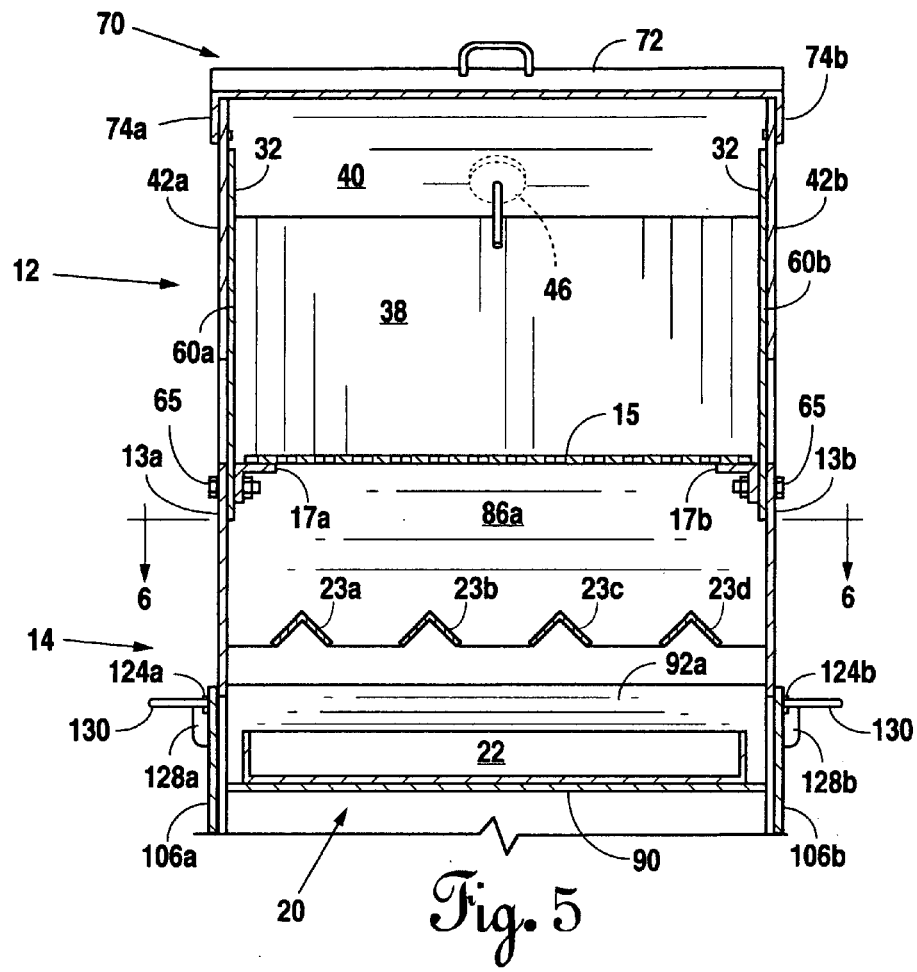
FIG. 5 is a vertical cross sectional view along line 5—5 of FIG. 4.

As shown in FIGS. 2, 4, and 5, the grill 15 rests on the upper shoulder panels 16a and 16b of the casing 11 and across the opening created between the upper shoulder panels 16a and 16b. The grill 15 also rests on mounting brackets 17a and 17b secured to the interior surfaces of the mounting flanges 67a and 67b with nut and bolt combinations 65.

Referring to FIGS. 1–4, the housing 14 is formed by the housing sidewalls 13a and 13b mounted to the casing 11; the casing 11 is preferably formed by one continuous, rectangular sheet of material which is bent to form a floor panel 80, a front panel 82, a back panel 84, the upper shoulder panels 16a and 16b, and two smoke deflection panels 86a and 86b, all of which are of equal width.

Still referring to FIGS. 1–4, the front panel 82 and back panel 84 of the casing 11 extend and angle inwardly respectively from the front edge and back edge of the upper shoulders 16a and 16b. The floor panel 80 is horizontal and extends between the lower ends of the front panel 82 and back panel 84. The upper shoulder panels 16a and 16b are horizontal and extend inwardly from the upper ends of the front panel 82 and back panel 84 respectively. In the exemplary embodiment, the length of the front panel 82 and back panel 84 is approximately 28 inches and each forms an inward angle in a range of approximately 10°–15° with a vertical plane. However, it is anticipated that the length of the front panel 82 and back panel 84 and the inward angles formed by the front panel and the back panel 84, with a vertical plane, can vary as long as the enclosure formed by the casing 11 is of sufficient size to contain the firebox 18, a desired quantity of fuel 19, the smoke shield 20, the drip pan 22, the upper smoke deflection panels 86a and 86, and the smoke collection members 23a, 23b, 23c, and 23d in a manner consistent with this invention.

Referring to FIGS. 3–5, the upper smoke deflection panels 86a and 86b extend downwardly and at an inward angle from the inner ends of the upper shoulder panels 16a and 16b respectively and form upper smoke chambers 88a and 88b within the housing between the upper smoke deflection panels 86a and 86b and the front panel 82 and back panel 84 respectively. In the exemplary embodiment, the inward angle formed with a vertical plane by the smoke deflection panels 86a and 85b are equal to or slightly greater than the inward angles formed by the front panel 82 and back panel 84 with a vertical plane. However, it is anticipated that the inward angle formed by the smoke deflection panels 86a and 86b with a vertical plane can vary as long as the smoke deflection panels 86a and 86b cause smoke from the fuel to be collected in the upper smoke chambers 88a and 88b, and direct it into the smoke collection members 23a, 23b, 23c and 23d in a manner consistent with this invention.

Referring to FIGS. 1–4, each of the housing sidewalls 13a and 13b are preferably constructed of one continuous solid sheet of material, which, in the exemplary embodiment, is 16 gauge sheet metal. The width of the housing sidewalls 13a and 13b is equal to the distance between opposing outer edges of the upper shoulder panels 16a and 16b. Preferably, the housing sidewalls 13a and 13b are mounted to the casing 11 along its outer edges with welds. However, other means of attachment are acceptable and anticipated. The length of the sheets of material forming the housing sidewalls 13a and 13b are sufficient to allow the housing sidewalls 13a and 13b to extend downwardly beyond the floor panel 80 of the casing 11 and to be bent 90° inwardly and then 90° upwardly along two horizontal creases to form feet 100a, 100b, 100c, and 100d with exterior segments 101a, 101b, 10c, and 101d, interior segments 103a, 103b, 103c, and 103d, base segments 105a, 105b, 105c, and 105d, and interior support panels 102a and 102b.

Upper rectangular openings 104a and 104b are punched out of the housing sidewalls 13a and 13b and are covered with side doors 106a and 106b and vent hatches 136a and 136b both of which are pivotally connected to the housing sidewalls 13a and 13b.

Still referring to FIGS. 1–4, lower rectangular openings 108a and 108b are punched out of the housing sidewalls 13a and 13b to form the separation between the feet 100a, 100b, 100c, and 100d. In the exemplary embodiment, the depth of each of the exterior segments 101a, 101b, 10c, and 101d, interior segments 103a, 103b, 103c, and 103d and base segments 105a, 105b, 105c, and 105d are approximately 6 inches respectfully. In addition, the width of each of the base segments 105a, 105b, 105c, and 105d are equal and are approximately 3 inches. However, it is anticipated that these equal widths and equal depths are of the exterior segments 101a, 101b, 10c, and 101d, interior segments 103a, 103b, 103c, and 103d, and base segments 105a, 105b, 105c, and 105d may vary as long as the size of the feet 100a, 100b, 100c, and 100d is sufficient to support the weight of the combination smoker and barbecue grill 10.

The interior support panels 102a and 102b extend vertically from the upper ends of the interior segments 103a, 103b, 103c, and 103d of the feet 100a, 100b, 100c, and 100d and connect to the bottom, outer surface of the floor panel 80 of the casing 11. In the preferred embodiment, the interior support panels 102a and 102b connect to the outer surface to the casing with welds. However, it is anticipated that other methods of connection may be used.

Still referring to FIGS. 1–4, the interior support panels 102a and 102b have tapered edges 107a, 107b, 107c, and 107d. Although not shown in the drawings, it can be appreciated that the interior support panels 102a and 102b are symmetrical from front to back and the back ends of the interior support panels have identical but opposite tapered edges as those shown in the drawings. The tapered edges 107a, 107b, 107c, and 107d angle inwardly from the top end of the outer edges of the interior segments 103a, 103b, 103c, and 103d of the feet 100a, 100b, 100c, and 100d to the floor panel 80 at its nearest outer edge.

Figure 6:
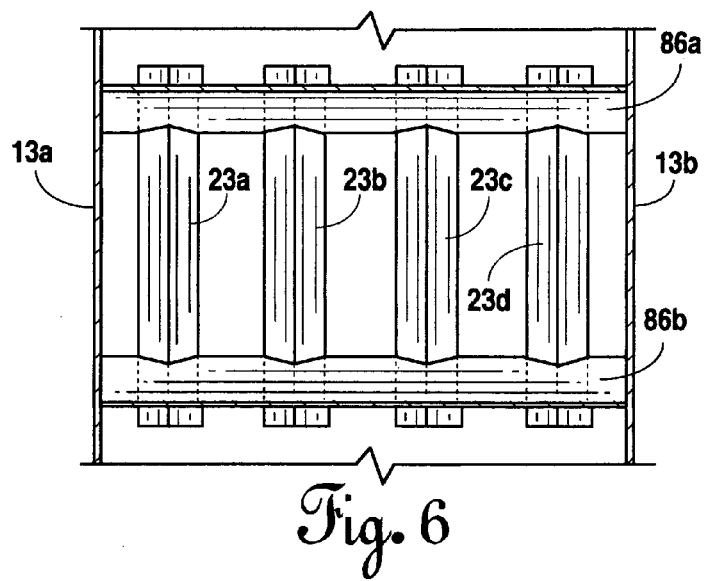
FIG. 6 is a horizontal cross sectional view along line 6—6 of FIG. 5.

Referring to FIGS. 3–6, the plurality of smoke collection members 23a, 23b, 23c, and 23d attach to and bridge the lower ends of the smoke deflection panels 86a and 86b. As shown in FIGS. 4, 5, and 6, each of the smoke collection members 23a, 23b, 23c, and 23d are identical in size and shape and have a sufficient length such that the opposite ends of each smoke collection members 23a, 23b, 23c, and 23d extend an equal length beyond the lower ends of the smoke deflection panels 86a and 86b into the upper smoke chambers 88a and 88b at opposite ends. As shown in FIGS. 4 and 5, each the smoke collection members 23a, 23b, 23c, and 23d have an open-ended bottom with a solid upper surface designed to trap and collect smoke which drifts into it from the upper smoke chambers 88a and 88b. In the exemplary embodiment, the upper surface of the smoke collection members 23a, 23b, 23c, and 23d is triangular and formed with two-inch angle iron. However, it is anticipated that other shapes, such as square or semicircular, are acceptable.

Referring again to FIGS. 4, 5, and 6, the smoke collection members 23a, 23b, 23c, and 23d are attached to the smoke deflection panels 86a and 86b by positioning them into cuts made in the lower ends of each of the smoke deflection panels 86a and 86b. The cuts are evenly spaced across the width of the lower ends of each of the smoke deflection panels 86a and 86b and positioned such that the smoke collection members 23a, 23b, 23c, and 23d are parallel to each other when attached. The cuts are shaped to conform to the shape of the upper surface of the smoke collection members 23a, 23b, 23c, and 23d so that the bottom edges of the smoke collection members 23a, 23b, 23c, and 23d are even with the lower edges of the smoke deflection panels 86a and 86b. The preferred embodiment of this invention has four smoke collection members 23a, 23b, 23c, and 23d. However, it is anticipated that a fewer or greater number of smoke collection members may be used.

Referring now to FIGS. 2–4, the smoke shield 20 is positioned between the firebox 18 and the lower edges of the smoke deflection panels 86a and 86b. The 11 smoke shield 20 is desirably constructed of one continuous rectangular sheet of material which is bent along two horizontal creases to form a bottom panel 90 and two angled side panels 92a and 92b. The smoke shield 20 is centered between the front panel 82 and back panel 84 of the casing 11 and positioned so that the bottom panel 90 is horizontal, and the angled panels 92a and 92b extend upwardly and outwardly towards the front panel 82 and back panel 84 respectively. The width of the smoke shield 20 is equal to the width of the casing 11 and is attached to the interior surfaces of the housing sidewalls 13a and 13b preferably with welds. However, it is anticipated that other means of attachment may be used. Preferably, the depth of the smoke shield 20 after bending is approximately equal to the depth of the floor panel 80 of the casing 11. In the exemplary embodiment, the height of the smoke shield 20 after bending is approximately 4 inches and the angled panels 92a and 92b form approximately a 30° angle with a vertical plane (See FIG. 4). However, it is anticipated that the depth and height of the smoke shield 20, as well as the angle of the angled panels 92a and 92b may vary as long as the size and shape of the smoke shield 20 is sufficient to direct smoke 21 from the firebox 18 into the upper smoke chambers 88a and 88b in a manner consistent with this invention.

Referring again to FIGS. 2–4, the rectangular firebox 18 has rectangular sidewalls and is placed on the floor panel 80 of the casing 11 during normal operation of the combination smoker and barbecue grill. The firebox 18 is small enough to fit within the perimeter of the floor panel 80 and through the upper rectangular openings 104a and 104b when a rotatable vent hatch 136a and 136b is rotated to an open position (See FIGS. 1 and 3) but large enough to hold fuel 19, such as charcoal or firewood, sufficient to create adequate cooking temperatures.

Still referring to FIGS. 2–4, the drip pan 22 is also rectangular with rectangular sidewalls and is placed on the upper surface of the bottom panel 90 of the smoke shield 20 during normal operation of the combination smoker and barbecue grill. The drip pan 22 is large enough to catch the drippings from cooked items on the grill 15 and small enough to fit within the perimeter of the bottom panel 90 of the smoke shield 20 and through the upper rectangular openings 104a and 104b when the side doors 106a and 106b are rotated to an open position.

FIG. 1 shows how one side door 106a and vent hatch 136a are mounted to the housing sidewall 13a. It can be appreciated that a second door 106b and a second vent hatch 136b are mounted to the opposite housing sidewall 13b in an identical manner as depicted in FIG. 3. Now referring to FIGS. 1 and 2, the side door 106a is pivotally mounted to the housing sidewall 13a by small cylindrical extensions 120a and 120b which extend horizontally from the lower ends of the vertical edges of the side door 106a and which rotate and slide within lower notches 122a and 122b between the housing sidewall 13a and lower door brackets 123a and 123b. As shown in FIG. 1, the side door 106a is held in its closed position by four rectangular tongue pieces 124a, 124b, 124c, and 124d which are mounted to the outer face of the side door 106a. Two tongue pieces 124a and 124b are mounted near the upper end of the side door 106a and extend outwardly and horizontally from opposite vertical edges of the side door 106a. Two tongue pieces 124c and 124d are mounted near the lower end of the side door 106a and also extend outwardly and horizontally from opposite vertical edges of the side door 106a. As shown in FIGS. 1 and 2, two tongue pieces 124a and 124b are positioned to slide into upper notches 126a and 126b in upper door brackets 128a and 128b when the 106a is in a closed position. Similarly, two tongue pieces 124c and 124d are positioned to slide into upper notches 126c and 126d in the lower door brackets 123a and 123b when the side door 106a is in a closed position.

Still referring to FIGS. 1 and 2, the side door 106a is equipped with a handle 130 towards its upper end. In order to open the door 106a, the handle 130 is lifted vertically causing the door 106a to slide vertically and allow the tongue pieces 124a, 124b, 124c, and 124d to clear the lips of the upper notches 126a, 126b, 126c, and 126d. Simultaneously, the cylindrical extensions 120a and 120b slide upward within the lower notches 122a and 122b. The side door 106a can then rotate outwardly with the lower tongue pieces 124c and 124d engaging and sliding on upper curved edges 132a and 132b of the lower door brackets 123a and 123b. The vertical height of the lower notches 122a and 122b is sufficient to allow the cylindrical extensions 120a and 120b to slide vertically a sufficient height which, in turn, allows the tongue pieces 124a, 124b, 124c, and 124d to clear the lips of the upper notches with minimal clearance when the side door 106a is lifted vertically from its closed position.

Still referring to FIGS. 1 and 2, the lower brackets have shoulders 134a and 134b at the lower end of the curved edges 132a and 132b. The shoulders 134a and 134b engage the lower tongue pieces 124c and 124d as the side door 106a rotates outwardly. The shoulders 134a and 134b are positioned to prevent the side door 106a from rotating greater than 90°. When the lower tongue pieces 124c and 124d engage the shoulders 134a and 134b, the door 106a rests in a horizontal plane and can act as a shelf for placement of the firebox 18 and drip pan 22 during cleaning.

Still referring to FIGS. 1 and 2, the vent hatch 136a is positioned below the side door 106a such that the upper edges of the vent hatch 136a is adjacent the lower edge of the side door 106a. The vent hatch 136a is rectangular and has a width equal to the width of the side door 106a and height sufficient to cover the remainder of the upper rectangular opening 104a which is not covered by the side door 106a and to allow the removal of the firebox 18 when the vent hatch 136a is rotated to its opened positioned. An elongated rectangular plate 138 is attached to the outer surface of the vent hatch 136a near its upper end. The width of the plate 138 is equal to the width of the vent hatch and the vertical height of the plate 138 is sufficient to allow the upper edge of the plate 138 to extend vertically from the upper edge of the vent hatch 136a and overlay the bottom edge of the side door 106a when the side door 106a and the vent hatch 136a are in their closed position. In the preferred embodiment, the plate 138 is attached to the vent hatch with welds. However, other methods of attachment are anticipated.

The vent hatch 136a is pivotally mounted to the lower door brackets 123a and 123b by an elongated cylindrical rod 140 mounted to the vent hatch 136a along its bottom edge preferably with welds. Opposing ends of the rod 140 extend beyond the vertical edges of the vent hatch 136a into holes in the lower brackets 123a and 123b. The opposing ends of the rod 140 fit and rotate in the holes with minimal clearance. A handle 144 is attached to and centered on the plate 138 and is used for opening and closing the vent hatch 136a. A spring loaded pressure pin 146 is mounted to the vent hatch 136a adjacent one vertical edge of the vent hatch 136a near its upper end. The spring loaded pressure pin 146 is positioned so that a pinhead (not shown), presses against the inner surface of the lower bracket 123a creating a frictional force which allows the vent hatch 136a to remain in place in any rotated position. In this manner, the vent hatch can act as a vent by rotating the vent hatch into varying positions.

The lower bracket 123a has first and second holes 148a and 148b. The first hole 148a is positioned to accept the pinhead (not shown) when the vent hatch 136a is in its vertical, closed position. The second hole 148b is positioned to accept the pinhead (not shown) when the vent hatch 136a is rotated 90° to a horizontal open position. In this manner, the vent hatch 136a will remain locked in a closed position or horizontally open position unless the pinhead (not shown) is manually released.

In the exemplary embodiment, the side doors 106a and 106b, vent hatches 136a and 136b, and plates 138 are constructed of ¼ inch sheet metal. However, it is anticipated that other materials and suitable gauges of material can be used.

FIG. 4 depicts how the combination smoker and barbecue grill works in normal operation. When it is desired to smoke food items placed on the grill 15, the fuel 19 is first placed in the firebox 18 which is positioned on the floor panel 80 of the casing 11. The fuel 19 is lit and when the temperature in the combination smoker and barbecue grill 10 reaches a desired level, food items are placed on the grill 15 and the hood 12 is closed. As shown in FIG. 4, the smoke 21 and heat which rises from the burning fuel 19 is blocked by the smoke shield 20 and is caused to deflect and pass to the left and right of the smoke shield 20 and past the angled panels 92a and 92b of the smoke shield 20. This directs the smoke 21 into the upper smoke chambers 88a and 88b where it collects and fills the upper smoke chambers 88a and 88b from top to bottom. As the collected smoke 21 reaches the bottom of the smoke chambers 88a and 88b, it drifts into the smoke collection members 23a, 23b, 23c, and 23d from their open-ended opposite ends and bottoms. The smoke 21 will then collect and fill each of the smoke collection members 23a, 23b, 23c, and 23d evenly from top to bottom along the length of the smoke collection members. Once the smoke 21 has filled each of the smoke collection members 23a, 23b, 23c, and 23d, it spills out the open-ended bottoms of the smoke collection members in a substantially even volume along the length of each of the smoke collection members. The smoke will also spill from the upper smoke chambers around the bottom edge of the smoke deflection panels 86a and 86b between the smoke collection members 23a, 23b, 23c, and 23d and between the housing sidewalls 13a and 13b and the outer most smoke collection members 23a and 23d. This creates a substantially even distribution of the smoke 21 drifting upwards from the smoke collection members 23a, 23b, 23c, and 23d to the food items on the grill 15. In this manner, the food items are cooked and smoked evenly. As the smoke 21 drifts upward past the grill and food items, it will collect in the hood 12. The vent cover 70 can be selectively rotated to either a partially or fully open to allow the collected smoke 21 to escape. The volume of smoke 21 which can escape from hood 12 can be regulated by the degree of rotation of the vent cover 70.

Still referring to FIG. 4, the drip pan 22 is placed on the top surface of the bottom panel 90 of the smoke shield 20. Drippings from the food items will fall into the drip pan 22 where they will evaporate creating vapors which will rise back towards the food items on the grill 15, further flavoring the food items. If desired, water can be placed in the drip pan 22 during the smoking process which will create steam which mixes with the smoke 21 and helps prevent the food items from drying out during the smoking process.

If it is desired to barbecue the food items, the firebox 18 is placed on top of, and rests on, the outer surfaces of the smoke collection members 23a, 23b, 23c, and 23d. In this manner, the heat and smoke 21 created by the burning fuel 19 is much closer to and directly heats and cooks the food items on the grill 15 in a traditional barbecue style.

Although the invention has been described with reference to specific embodiments, this description is not meant to be construed in a limited sense. Various modifications of the disclosed embodiments, as well as alternative embodiments of the inventions will become apparent to persons skilled in the art upon the reference to the description of the invention. It is, therefore, contemplated that the appended claims will cover such modifications that fall within the scope of the invention.

We claim:

1. A combination smoker and barbecue pit for cooking and smoking food items from a fuel burning heat source comprising:
    a firebox for holding said fuel burning heat source;
    a housing for containment of said firebox and said fuel burning heat source;
    a grill located above said firebox on said housing;
    a hood over said grill;
    at least one smoke collection member which collects smoke from said fuel burning heat source and substantially evenly distributes said smoke to said food items on said grill.

2. A combination smoker and barbecue pit as recited in claim 1 further comprising at least one smoke chamber that traps said smoke from said fuel burning heat source and channels said smoke into said at least one smoke collection member.

3. The combination smoker and barbecue pit as recited in claim 2 further comprising a smoke shield between said firebox containing said fuel burning heat source and said grill wherein said smoke shield deflects and directs said smoke into said at least one smoke chamber.

4. The combination smoker and barbecue pit as recited in claims 1, 2, or 3 wherein said at least one smoke collection member is a plurality of smoke collection members evenly spaced below said grill.

5. A combination smoker and barbecue pit for cooking and smoking food items from a fuel burning heat source comprising:
    a firebox for holding said fuel burning heat source;
    a housing for containment of said firebox and said fuel burning heat source;
    a grill located above said firebox on said housing;
    a hood over said grill;
    at least one smoke chamber wherein which collects said smoke from said fuel burning heat source;
    a plurality of smoke collection members that receive smoke from said at least one smoke chamber and substantially evenly distribute said smoke to said food items on said grill.

6. The combination smoker and barbecue pit as recited in claim 5 further comprising a shield between said fuel burning heat source and said grill wherein said shield deflects and directs smoke into said at least one smoke chamber.

7. The combination smoker and barbecue pit as recited in claim 6 further comprising a drip pan, said drip pan resting on a top surface of said shield.

8. The combination smoker and barbecue pit as recited in claim 6 wherein said plurality of said smoke collection members are evenly spaced below said grill.

9. The combination smoker and barbecue pit as recited in claim 8 wherein said housing further comprises:
    a casing forming a front wall, bottom wall and back wall of said housing; and
    two side walls attached to said casing.

10. The combination smoker and barbecue pit as recited in claim 9 further comprising:
    at least one opening in at least one of said two sidewalls;
    at least one door pivotally mounted to said at least one of said two side walls, said door covering an upper portion of said at least one opening;
    at least one vent hatch pivotally mounted to said at least one of two said side walls below said at least one door, said vent hatch covering a lower portion of said opening and being adjacent said firebox containing said fuel burning heat source.

11. The combination smoker and barbecue pit as recited in claim 8 further comprising:
    a vent opening in said hood;
    a vent cover pivotally mounted to said hood for selectively opening or closing said vent opening;
    a temperature gauge mounted in said hood.

12. The combination smoker and barbecue pit as recited in claim 10 or 11 further comprising:
    a first pressure pin mounted to said vent cover to control pivotal movement thereof;
    a second pressure pin mounted to said at least one vent hatch to control movement thereof.

13. The combination smoker and barbecue grill as recited in claim 6 wherein vertical position of said firebox containing said fuel burning heat source within said housing is adjustable to a position above said shield and below said grill.

14. A method of operation of a combination cooker and smoker of food items from a smoking heat source comprising the following steps:
    placing food items on a grill mounted at a first location in or on a housing;
    creating said smoking heat source at a second location in said housing;
    collecting smoke from said smoking heat source at least one third location in below said grill;
    substantially evenly distributing said smoke to said food items.

15. The method of operation of a combination cooker and smoker as recited in claim 14 wherein said smoke collecting step further comprises the steps of:
    trapping said smoke deflected by a shield in a chamber within said housing deflecting said smoke from said smoking heat source around said shield mounted in said housing;
    channeling said smoke from said chamber into at least one smoke collection member.

16. The method of operation of a combination cooker and smoker as recited in claim 15 wherein said smoke distributing step further comprises the steps of:
    overfilling said at least one smoke collection member with said smoke;
    releasing said smoke from said at least one smoke collection member in a substantially even distribution below said food items on said grill; and
    exposing said food items to said smoke.

17. The method of operation of a combination cooker and smoker as recited in claim 16 wherein said at least one smoke collection member is a plurality of evenly spaced smoke collection members.

18. The method of operation of a combination cooker and smoker as recited in claim 16 further comprising the steps of:

catching said smoke in a hood mounted over said grill; and venting said smoke from said hood.

* * * * *